(12) United States Patent
Engl

(10) Patent No.: US 7,586,430 B2
(45) Date of Patent: Sep. 8, 2009

(54) INTEGRATED CIRCUIT COMPRISING A MIXED SIGNAL SINGLE-WIRE INTERFACE AND METHOD FOR OPERATING THE SAME

(76) Inventor: Bernhard Engl, Buchenweg 2, Stephans Kirchen (DE) 83071

( * ) Notice: Subject to any disclaimer, the term of this patent is extended or adjusted under 35 U.S.C. 154(b) by 150 days.

(21) Appl. No.: 11/910,342

(22) PCT Filed: Mar. 15, 2006

(86) PCT No.: PCT/DE2006/000452

§ 371 (c)(1),
(2), (4) Date: Oct. 1, 2007

(87) PCT Pub. No.: WO2006/102864

PCT Pub. Date: Oct. 5, 2006

(65) Prior Publication Data

US 2008/0315934 A1 Dec. 25, 2008

(30) Foreign Application Priority Data

Mar. 29, 2005 (DE) .................. 10 2005 014 133

(51) Int. Cl.
*H03M 1/12* (2006.01)
(52) U.S. Cl. ..................... 341/155; 326/37; 326/38; 326/41; 341/141
(58) Field of Classification Search ........... 341/155; 326/37–41
See application file for complete search history.

(56) References Cited

U.S. PATENT DOCUMENTS 4,556,958 A   12/1985   Ugon (Continued)

FOREIGN PATENT DOCUMENTS

DE   3921744 A1   1/1991

(Continued)

OTHER PUBLICATIONS

Heintz et al, Einsatzmoglichkeiten und Zukunftschancen "intelligenter" Sensoren im Kraftfahzeug (English Title: Possibilities of Incorporation and Future Prospects of 'Intelligent' Sensors in the Motor Vehicle), 1990, Bosch Technische Berichte, vol. 52, pp. 30-41

(Continued)

*Primary Examiner*—Khai M Nguyen
(74) *Attorney, Agent, or Firm*—Brooks Kushman P.C.

(57) ABSTRACT

The invention relates to an integrated circuit (1) which comprises a novel bidirectional mixed signal single-wire interface (6) via which the circuit receives command information from a host and transmits conditioned analog signals to the host. In order to implement the mixed signal interface, the integrated circuit is provided with means for analog signal conditioning (2), command detection (3), and digital control (4). In a preferred embodiment of the invention, current detectors are used for command detection and respond to the current flowing through the interface connection (6) so that commands can be given even when analog signals are present on the bus. The invention relates to several methods of operation, especially methods for operating a plurality of the integrated circuits on the same mixed signal bus, and methods for the compatible operation with conventional integrated circuits. The invention especially provides an inexpensive method for producing intelligent sensors in conjunction with a conventional microcontroller having an ADC as the host. Sensors can be connected via raw signal inputs (14) or can reside on the integrated circuit itself.

16 Claims, 3 Drawing Sheets

U.S. PATENT DOCUMENTS

| | | | |
|---|---|---|---|
| 4,736,367 A | 4/1988 | Wroblewski et al. | |
| 4,817,040 A | 3/1989 | Bodley-Scott | |
| 5,398,326 A | 3/1995 | Lee | |
| 5,412,644 A | 5/1995 | Herberle | |
| 5,686,844 A * | 11/1997 | Hull et al. | 326/38 |
| 5,809,518 A | 9/1998 | Lee | |
| 5,847,450 A | 12/1998 | Fink et al. | |
| 5,869,979 A * | 2/1999 | Bocchino | 326/38 |
| 6,239,732 B1 | 5/2001 | Cusey | |
| 6,509,758 B2 * | 1/2003 | Piasecki et al. | 326/37 |
| 6,768,617 B2 * | 7/2004 | Marr | 361/56 |
| 6,981,090 B1 * | 12/2005 | Kutz et al. | 710/317 |
| 7,366,577 B2 * | 4/2008 | DiSanza et al. | 700/94 |

FOREIGN PATENT DOCUMENTS

| | | |
|---|---|---|
| DE | 10335905 A1 | 2/2005 |

OTHER PUBLICATIONS

Degrauwe et al, Adaptive Biasing CMOS Amplifiers, Jun. 1982, IEEE Journal of Solid-State Circuits, vol. SC-17, No. 3, pp. 522-528.

* cited by examiner

INTEGRATED CIRCUIT COMPRISING A MIXED SIGNAL SINGLE-WIRE INTERFACE AND METHOD FOR OPERATING THE SAME

FIELD OF THE INVENTION

This invention is in the field of integrated circuits and methods therefor and, more particularly, is an integrated circuit device capable of conditioning analog signals and then feeding these conditioned analog signals over a novel bidirectional mixed signal single-wire interface to a common processing circuit which has means to further process the conditioned analog signals. In example, the processing circuit can be a microcontroller with an analog-to-digital converter. The processing circuit is able to digitally control the inventive integrated circuit device via the same single-wire interface. The invention also comprises methods for operating one or more of the inventive integrated circuit(s) on the bidirectional mixed signal single-wire bus line.

DESCRIPTION OF THE RELATED ART

Many bus systems having low contact count or low conductor count are known to the state of the art.

Usually such bus systems revolve around the objective to transfer digital data between at least two data processors or a data processor and intelligent peripherals or intelligent sensors, while needing only a minimum number of electrical conductors or contacts on an integrated circuit package. In particular, two-wire or three-wire bus systems having data lines and a clock line, known under trademarks or acronyms like $I^2C$, SPI or Microwire, etc., are ubiquitous.

However, it is not always practical to occupy several port contacts and to provide two signal conductors or wires, especially with low-cost, low-contact-count microcontrollers such as the eight contact PIC16F629 or the six contact PIC10F devices manufactured by Microchip Technology [9].

For many applications of those or similar low-contact-count chips from other manufacturers, use of several wires or several port contacts is prohibitive, so a single-wire bus system may be the only solution.

To the state of the art, several single-wire bus systems are known, and a small selection of those appearing to be relevant for this invention will be briefly discussed in the following.

Ugon [1] discloses a bidirectional data transmission method using only one signal conductor for communications between two microprocessors, based on the fact that common microprocessor (or microcontroller) port contacts can be changed from an input mode to an output mode under software control. Each end of the signal conductor is connected to a single port contact each of the two microcontrollers, which is the absolute minimum for that purpose. In such a system, only three electrical conductors are needed to connect an intelligent peripheral to a host system: one conductor each for power, the signal, and ground return. If the peripheral has its own power supply, only two conductors, signal and ground return, are needed. In Ugon's system, digital logic states '0' and '1' may be represented either by voltage or by current levels in the signal conductor.

Wroblevski et al [2] disclose a single-wire bus multiplex system in which the single-wire bus does not only carry bidirectional data, but also provides power to a multitude of intelligent sensors or peripheral units. Commands from a bus master to the sensors or peripheral units are encoded by several voltage levels on the bus line. The sensors or peripheral units respond by injecting current signals into the singe-wire bus. In the bus master's receiver these current signals are converted into voltage signals and then they are digitized by an analog-to-digital converter (ADC) which is part of the bus master.

Bodley-Scott [3] discloses yet another single-wire bus system, where a multitude of intelligent sensors each contains its own analog-to-digital converter.

Lee [4] discloses a method for data communication over a single-wire bus, where the bus master tests the logic state of the bus by attempting to drive it high after a certain time delay in which the peripheral unit or slave device is expected to answer by either pulling the bus low or letting it float. Said attempt fails if the peripheral pulls the bus low, hence, two digital logic states can be discerned during said read operation.

Heberle [5] employs the act of locking the single-wire line at a predetermined voltage level as a signal to terminate a digital transmission sequence.

Lee [6] further discloses a command and data transfer protocol for the single-wire bus architecture of [4], in which a serial command word is divided into portions which can be used to reset the slave circuit, request it to identify itself, and to specify the type of data transfer that is to occur between the host system and the slave circuit.

Cusey [7] uses the single-wire bus of [4] for a single-wire device with A-to-D converter, which may be employed to digitize sensor signals and transfer the digitized signals via the single-wire bus to a host system.

While the above patents certainly do find many useful applications, they all fall short of achieving one particular objective that recently has arisen by the market demand for intelligent sensors: providing a solution for sensor signal amplification, analog-to-digital conversion, digital signal processing, and communication with a host system at the lowest possible cost while offering high accuracy.

The reason for this is such that above single-wire bus systems are basically digital in nature: although their peripheral units or intelligent sensors and the like, when responding to their master's request, do put electrical quantities such as voltages or currents on the one-wire-bus, these voltages or currents do only encode digital information, such as logic '0', logic '1', 'switch closed', 'sensor present', and so on, although said digital information may be encoded by more than two possible current or voltage levels and may be interpreted by an ADC located in the master, as is the case in Wroblevski et al.

Due to their basically digital nature, if these related art single-wire bus systems are used for measurement of non-digital quantities, in example temperature or pressure signals from a sensor, the intelligent sensor peripherals connected to the bus each must contain their own analog-to-digital converter, which is expensive to manufacture if good performance is desired. The teachings of Cusey [7] drastically illustrate the various elaborate and costly means and methods required to trim and calibrate an ADC and its reference to the required accuracy.

Yet another cost-driving disadvantage of those bus systems who do provide energy to their peripheral units via the bus is the need for an accurate reference voltage source within each peripheral unit. The silicon area needed for it may be cheap to have, but the trimming and testing required for high accuracy and low temperature drift over a guaranteed temperature range is relatively expensive.

Still another disadvantage of said related art bus systems is that the process of digitizing a signal within the peripheral unit inherently limits the achievable sample rate to a relatively low level, when compared to the capabilities of on-chip ADCs of modern microcontrollers. Depending on the particular bus protocol used, it also may be difficult—if not impossible—to accurately control the sampling points on the time axis, which is very important for real time mixed signal processing.

Finally, the method of locking the bus at a predetermined voltage level as a signal to terminate a transmission sequence, if used in modern CMOS technologies having quite strong output buffers and two of those strong buffers fighting each other may lead to reliability problems, unwanted power supply fluctuations, and other deleterious by-effects which severely interfere with the objective to precisely measure weak sensor signals.

OBJECTIVES OF THE INVENTION

A first objective of the present invention is to provide an integrated circuit (IC) device for the conditioning of analog signals, which, besides being feasible with a minimum number of contacts, has a novel bidirectional mixed signal single-wire interface, where the practical realisation of this interface is feasible with as low expenditure as possible. Even with a minimum implementation the inventive IC shall be capable to receive digital commands and transfer conditioned analog signals over said interface.

It is a second objective of the invention to provide a particularly advantageous type of command detecting means for it, which allow to recognize commands on the mixed signal single-wire line safely and with low expenditure despite there exist analog and digital signals on the line.

It is a third objective of the invention to provide a first operating method for the inventive integrated circuit, in which the mixed signal single-wire line has at least two operating states, one to receive digital commands, one for transfer of conditioned analog signals, while the signalling of the end of transmission to the integrated circuit is possible at any time, even in analog transfer mode.

It is a fourth objective of the invention to further exploit the circuit means absolutely necessary for the above tasks to provide a command transfer to the inventive integrated circuit, where the command transfer is simple, absolutely reliable and has noncritical timing.

It is a fifth objective of the invention to enhance the first operating method such that the commanding bus master or microcontroller is able to reliably detect the end of the analog transfer mode and whether the inventive integrated circuit is ready for command reception.

It is a sixth objective of the invention to enhance the first operating method such that the commanding bus master or microcontroller is able to read purely digital data from the inventive integrated circuit.

It is a seventh objective of the invention to provide a second operating method for the inventive integrated circuit, in which more than one of the inventive integrated circuits can be connected to the commanding bus master or microcontroller via the same mixed signal single-wire transmission line, such that a novel mixed signal single-wire bus system is formed, in which a bus protocol and an addressing method ensure that only one of the inventive integrated circuits occupies the bus, without using additional control lines besides the mixed signal single-wire bus itself.

It is an eighth objective of the invention to provide a third operating method for the inventive integrated circuit, in which conventional integrated circuits not having the novel bidirectional mixed signal single-wire interface can be connected to the mixed signal single-wire bus and may use it for conventional exchange of digital data with the commanding bus master or microcontroller.

BRIEF DESCRIPTION OF A PREFERRED EMBODIMENT

According to the present invention an integrated circuit (IC) device with a bidirectional mixed signal single-wire interface is disclosed, comprising, in combination,
a semiconductor chip with circuitry to form analog signal conditioning means, command detection means, and digital control means;
a first contact electrically coupled to said circuitry where said first contact functions as a negative power supply contact;
a second contact electrically coupled to said analog signal conditioning means and said command detection means where said second contact functions at least as a combined digital command input and analog signal output contact;
a third contact electrically coupled to said circuitry where said third contact functions as a positive power supply contact;
wherein said command detection means provide command information, which is externally fed to said second contact, to said digital control means; and
wherein said digital control means steer said analog signal conditioning means in such a way that the bidirectional mixed signal single-wire interface can be switched at least between a command reception mode and a analog signal output mode.

In the application of the inventive IC device, its second contact is electrically connected to a general purpose input/output (I/O) port contact of a host, yielding a bidirectional mixed signal single-wire interface line between said contacts. In example, the host may be a microcontroller having software programmable input/output ports, where at least one of those must be programmable either as a digital push/pull output driver stage, or alternately as an input of an on-chip analog-to-digital-converter or a comparator.

In the preferred embodiment of the inventive IC device, the command detection means have the ability to detect overcurrent conditions on the second contact. These overcurrent conditions are effectuated by the digital push/pull output driver stage of the host whenever a command is to be issued to the inventive IC device. The command detection means can discern either a "push" or a "pull" condition, depending on which part of the host's output driver stage is active at the moment, such that both logic '0' or '1' can be encoded. The end of either overcurrent condition can be used to clock the received command bit into the digital control means, which may be a finite state machine, a shift register or as just a latch having two states.

Upon the completion of a command, which may have as few as one bit, to any number of bits deemed necessary, and if commanded to do so, the digital control means switches the inventive IC device into a analog signal conditioning mode, where its analog signal conditioning means amplify and/or filter an analog signal which may be applied externally via contacts assigned therefor, or may come from an on-chip sensor placed on the inventive IC itself.

In the analog signal conditioning mode, the analog signal conditioning means drive the conditioned analog signal via the second contact onto the bidirectional mixed signal single-wire interface line. The host's general purpose I/O port contact is programmed as an input of its ADC or comparator, such that the host may process the conditioned analog signal as long as he pleases, continuously and without interruption or loss of signal. If the host wants to issue yet another command to the inventive IC device, in example to change the amplification gain factor, it can terminate the analog signal conditioning mode by reprogramming its general purpose I/O port as a digital push/pull output driver stage and use it to drive against the analog signal, which is detected by the command detection means and causes the digital control means to terminate the analog signal conditioning mode and enter the command reception mode again.

To avoid deleterious by-effects of high overcurrent, such as electromigration, thermal waves, and power supply fluctuations, as are known from related art systems [5] employing blocking of the bus by strong digital CMOS output buffers as a termination criterion, the present invention advantageously uses a relatively weak analog output driver stage—such as known from opamp circuits—in an amazing, novel and advantageous way for command reception. Here, current limiting circuitry known in the art of analog circuit design as means for short circuit protection of analog output buffers may be advantageously exploited as part of the command detection means.

The just described minimal version of the inventive IC with only two fundamental operational states, the command reception mode and the analog signal conditioning mode, which is terminated by counter-drive of the host, may be supplemented ingeniously by additional operational states.

A supplemental acknowledge mode may be provided to allow the host to unambiguously discern the correct termination of the analog signal conditioning mode. This is not trivial to solve, as a conditioned analog signal comes to mind which accidentally causes on the mixed signal interface the same voltage levels as used in the command mode.

A supplemental digital read mode may be used to read out inner states or registers of the inventive IC. The host can use this to check whether his settings in the inventive IC done by commands were correctly received. Also in the digital read mode, a current limited output driver stage is advantageously employed to output the digital data onto the mixed signal interface and the command detection means serve to discern counter-drive by the host, which is interpreted as a command to output the next bit.

Supplementary idle modes combined with addressing bits in the command and particular enhanced capabilities of the command detection means allow to creation of a novel bidirectional mixed signal single-wire bus system, which allows the connection and operation of multiple inventive ICs on a single bus line. The enhanced capabilities of the command detection means are not only to detect overcurrent conditions on the second contact, but also being able to discern three different voltage intervals there, which are defined by two threshold voltage values. Voltages below the lower threshold value are interpreted as 'logic 0', voltages above the upper threshold value are interpreted as 'logic 1', and the voltages between the threshold values are interpreted as 'logic U' (U=unknown), in which all three cases intervene with the control state machine, therefore a three-valued logic is used to analyse the state of the mixed signal single-wire bus.

These enhanced capabilities of the command detection means can be used in a compatibility mode which allows connection of conventional integrated circuits to the novel bidirectional mixed signal single-wire bus, even if they obviously can't have any knowledge of the novel mixed signal bus protocol ruling there. In this compatibility mode the inventive integrated circuits also connected to the bus are put into a passive idle mode which allows the host to deal with data transfers from and to the conventional integrated circuits over the bus, without the inventive integrated circuits interfering with this data transfer or thereby being disturbed themselves.

DETAILED DESCRIPTION OF THE INVENTION

The numerous innovative teachings of the present patent application will be described with particular reference to the presently preferred embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Exemplified Construction of an Inventive IC

Figure 1:
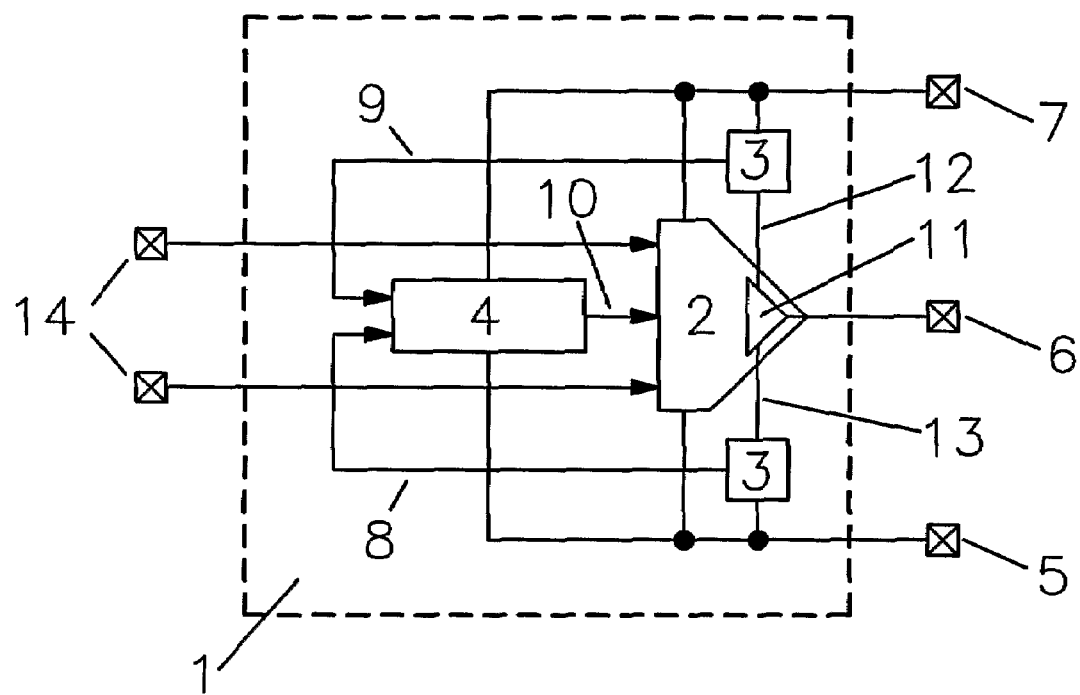
FIG. 1 is a simplified block diagram view of the inventive IC device.

Referring to FIG. 1, the inventive integrated circuit (IC) device of the instant invention is shown and generally designated by reference number 1.

The inventive IC device (1) with a novel bidirectional mixed signal single-wire interface comprises a semiconductor chip having circuitry to form analog signal conditioning means (2), command detection means (3), digital control means (4), a first contact (5) electrically coupled to said circuitry wherein said first contact serves for the negative power supply, a second contact (6) electrically coupled to said analog signal conditioning means and said command detection means wherein said second contact is the interface connector, a third contact (7) electrically coupled to said circuitry wherein said third contact serves for the positive power supply, wherein:

said second contact is electrically coupled to the analog signal conditioning means and the command detection means in such a way that it can act at least as a command input and an analog signal output, said command detection means provide command information (8, 9) to said digital control means, said digital control means steer the analog signal conditioning means in such a way that said second contact at least can be switched between a command reception mode and an analog signal output mode.

The negative power supply can be understood as a reference potential (ground) for signals on the bus. A 'contact' in the spirit of the invention not only can be implemented as a metal spike or 'pin' of a so-called 'leadframe', but can be every kind of electrical connection known for integrated circuits, especially metallisation pads on ceramic packages, or solder balls of the so-called flip-chip technique, or as a so-called 'bonding pad'. The invention allows utilisation of all state of the art or future electrical contact methods for integrated circuits, so the term 'contact' in the context of this description and the patent claims are to be understood as a synonym for an electrical contact of an integrated circuit in the broadest sense.

In a minimal implementation of the invention, a single digital control line (10) between the digital control means and the analog signal conditioning means is adequate, as two logic states are sufficient to select among the minimally two operational modes of the inventive mixed signal single-wire interface: command reception mode and analog signal conditioning mode. The bus protocol as such can be implemented as a state machine within the digital control means.

Command Reception Mode

In a first state, which preferably also is the power on state, the analog signal conditioning means are switched into a mode of operation in which its output drivers (11), connected to the second contact (6), either are inactive or attempt to weakly drive the contact to a predetermined voltage level. In this mode, the command detection means (3) are ready to discern command informations externally being fed to the second contact and pass them on to the digital control means, for which command bit signal lines (8) and (9) do serve.

The location and electrical connection of the command detection means within the circuitry of the inventive IC device can be anywhere and anyhow, depending on the particular method of operation chosen to transfer a command into the IC device.

For instance, command detection means may be directly connected to the second contact (6), and be implemented as a purely digital signal receiver, such as a schmitt trigger, able to detect either a high or a low voltage on the contact and interpret it as either logic '1' or logic '0'. In such an embodiment, the command may be a digital, asynchronously issued serial bit stream, such as known in the field as the RS232C standard, and the digital control means (4) then may include a so-called asynchronous communications interface adapter (ACIA).

Yet another possibility to implement command detection means could exploit the fact that analog signals never can be driven close towards the power and ground rails without being degraded by severe distortion. Modern opamp output stage circuits of the so-called 'rail-to-rail' variety are known to be able to drive signals without degradation as close as about 100 mV towards either power supply rail, but not closer, otherwise, they would also suffer from distortion. Robust design practice would then call for a guard band in the order of 200 mV—or more—towards each rail. Now, if the analog signal conditioning means include known limiting circuitry that limits or clamps its output drive to chosen limits, any voltage level on the second contact (6) exceeding these known limits cannot have been caused by any activity of the circuitry within the IC device (1), but must have been caused by external application of a higher or lower voltage on that contact. In such an embodiment, command detection means could be a pair of comparators whose first input is connected to the second contact (6), and whose second input is connected to either a low order high reference voltage that is close to one of the negative or positive power supply rails. On the outputs of the comparators, three states can be discerned: 'logic 1' when the voltage on the second contact (6) exceeds the high threshold towards the power supply rail, 'logic 0' when it exceeds the low threshold towards the negative power supply rail, and a third state which means that an analog signal between the thresholds is being present on the second contact.

Despite the command detection means mentioned above appear to be useful for the invention, and the last variant with the comparators will find use in a further developed embodiment of the invention presented later, they are no optimum solution to allow simple, absolutely reliable and timing-non-critical command transfer to the inventive integrated circuit under all operating conditions. The first variant with an ACIA has the drawback to need a stable time base of sufficient accuracy to accomplish the clock regeneration from the asynchronous serial data stream. Such a time base is relatively costly to implement and may limit the field of application of the invention. The second variant enforces a compromise between the allowed analog signal amplitude and the noise immunity for discerning the two logic states, furthermore, the implementation of a safely functional limiter circuit which cannot distort analog signals near the onset of the limiting action is costly, especially so for fast signals.

In the quest for a more elegant and robust solution for the command reception an amazing solution was discovered, which is one of the fundamental characteristics of the preferred embodiment of the invention.

Overcurrent Detectors as Command Detection Means

In the preferred embodiment, as shown in FIG. 1, command detection means (3) are implemented as current detectors which observe the current flowing into and out of the final output driver stage (11) of the analog signal conditioning means (2) connected to the second contact (6). In this case, command detection means are not directly electrically connected to the second contact, but they are still electrically coupled to the second contact, the electrical coupling taking place via said output driver stage (11), which in turn is electrically connected to said contact, such that command detection means implemented as current detectors can respond to counter-drive conditions externally applied to said contact (6). It is not absolutely necessary to use the output driver stage (11) of the analog signal conditioning means for command reception, even if this saves expenditure, but an additional driver stage connected to the second contact can also be used for command reception.

In the simplest case, the current detectors may be implemented by a pair of resistors and comparators, where the first resistor is connected between the positive power supply rail at the third contact (7), and the positive power supply line (12) of the output driver stage (11), and the second resistor is connected between the negative power supply rail at the first contact (5), and the negative power supply line (13) of the output driver stage (11). The two comparators are connected to the resistors and to two threshold voltage sources, such that if the current through a resistor exceeds a threshold determined by the resistor value and the threshold voltage sources, the output of the comparator signals an overcurrent condition. The two comparator output signals can be used to discern three states: 'logic 1' when the output stage current flowing into the negative power supply rail exceeds the threshold, 'logic 0' when the output stage current flowing from the positive power supply rail exceeds the threshold, and a third state which means that no counter-drive condition is present at the second contact (6).

A somewhat more elaborate circuit level solution for the current detectors could avoid the additional voltage drop over the resistors and sense the current in the output stage by use of replica techniques, however, as some 10 mV of voltage drop are sufficient to detect currents with useable accuracy, the additional complication of a replica technique is questionable except for applications with very low supply voltage, where even a few 10 mV loss of headroom would hurt. Even in the case of replica techniques, the command detection means still are being electrically coupled to the second contact (6) in any case, because the currents in the replica circuitry do replicate or track the current which flows through the output driver stage connected to the second contact (6), hence, any variation of the current through the second contact caused by external application of command signals by the host will cause a corresponding variation of current in the replica paths, which in turn can be detected and interpreted as command information. It shall be emphasized that the actual electrical coupling of command detection means to said second contact (6) which is a distinctive characteristic of the present invention may be concealed by use of replica techniques, but the existence of said coupling still can be revealed and proven by the fact that said command detection means, regardless how they may be implemented and buried within the circuitry, somehow must be able to observe what happens on said second contact (6), and derive command information from that observation, so whenever in a particular suspect IC device some command information is derived from a contact, there must be some form of electrical coupling of the command detection means to said second contact (6) according to the claims and scope of the present invention. So the proof is possible even if the circuitry is so complicated as to make it completely invisible how the electrical coupling was indeed accomplished.

In any case of employing current detectors, their output signals or some inner signal corresponding to the current can be used to limit the output stage current, thus protecting the active elements from overheating and the metallisation from electromigration. Alternatively, an output stage circuit topology may be used that inherently limits the available current. Adaptive biasing of the output stage may be used to improve its reaction to input transients while still keecontactg the maximum current during command issuing at lower levels.

It is already known to practitioners of the art of analog circuit design how to implement current detectors, replica stages, output stage current limiting and thermal protection, and adaptive biasing on a circuit level and therefore no detailed schematics are given. For the purpose of this invention it is deemed sufficient to have enumerated various known techniques which are suitable to implement the current detectors used as command detection means in the preferred embodiment. In more elaborated versions of the invention, a combination of current detectors and voltage level comparators may be used as command detection means.

Exemplary Application

Figure 2:
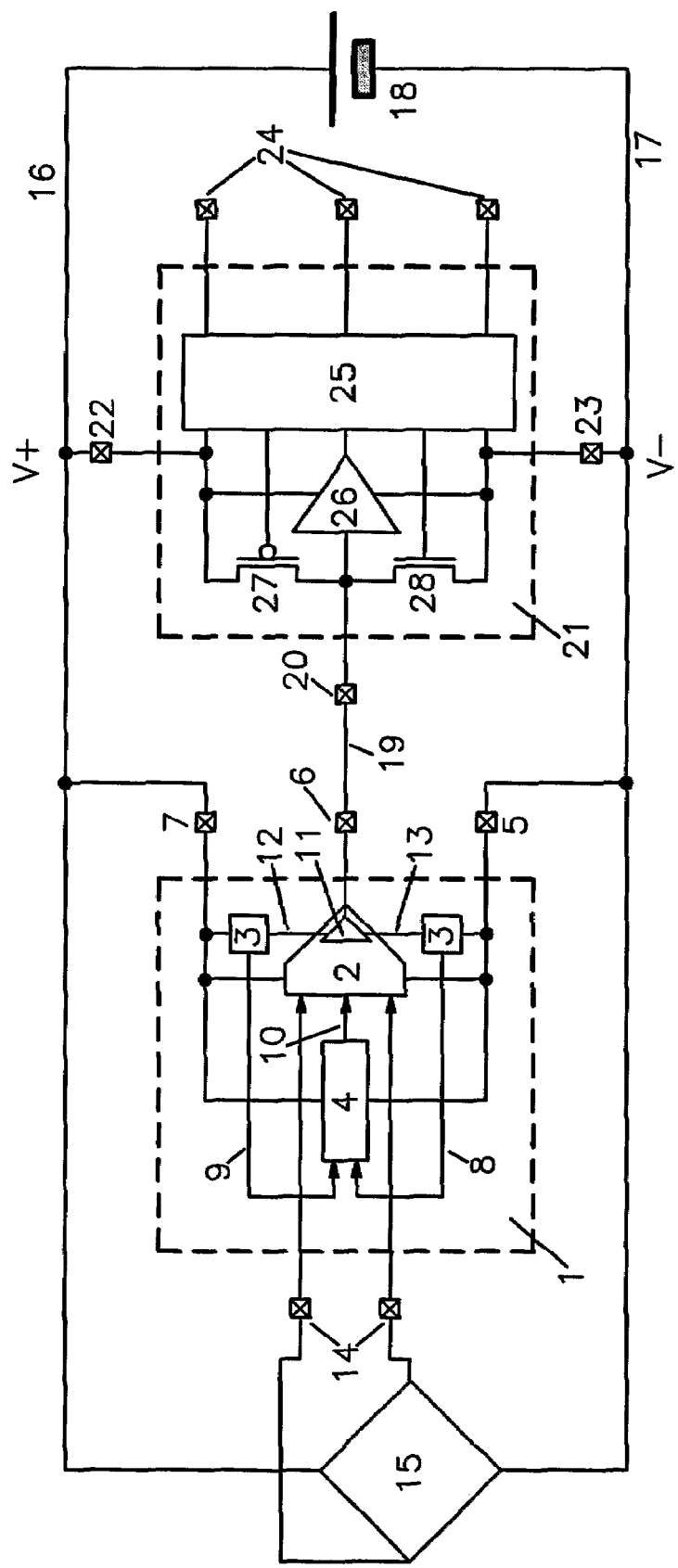
FIG. 2 shows an example of a typical application of the IC device of FIG. 1

Referring to FIG. 2, an application example for the inventive IC is shown and the cooperation with a host is explained.

The inventive IC device (1) is connected to a bridge-type sensor (15), which may be a piezoresistive pressure sensor or a strain gauge sensor. The bridge is being excited by a positive power supply line (16) and a negative power supply line (17) connected to a battery (18) or another supply of electricity. The commonly quite feeble bridge output signals are connected to two raw signal input contacts (14) of the inventive IC device (1). In this particular example, the analog signal conditioning means (2) within the IC device preferably include some sort of a gain-programmable instrumentation amplifier, where the setting of the gain is done by part of the command bits. The second contact (6) of the inventive IC device is connected to a mixed signal single-wire line or bus (19) which in turn is connected to a general purpose input/output contact (20) of a hypothetical microcontroller (21) known to the state of the art.

It shall be noted that the particular microcontroller shown in the figure is of a low contact count variety. It just has six contacts: the beforementioned general purpose input/output contact (20), a positive power supply contact (22), a negative power supply contact (23), leaving three further I/O contacts (24) free for other purposes, such as driving a display or for communication with a higher system level. The microcontroller's inner circuitry is shown in a simplified manner, the essential parts in the frame of this invention are as follows: a microcontroller core (25) having the usual RAM, ROM, ALU and control circuits, an analog-to-digital converter (26) and a digital output driver stage (27, 28), both of the latter electrically connected to the general purpose input/output contact (20) which is to be software programmable either as a digital push/pull output driver, or as input of the analog-digital-converter. In CMOS technologies, the upper digital driver stage device (27) may be a P-channel-MOSFET, and the lower digital driver stage device (28) may be a N-channel-MOSFET. For brevity, the following text will use 'PFET' and 'NFET', respectively, for naming said digital output driver devices, but it is understood that any suitable controllable switching means could be used as such a driver.

These characteristics of the microcontroller are fundamental for this application of the inventive IC device, and they are common in the world of modern microcontrollers. However, the scope of the invention is not limited to microcontrollers as a host. The inventive IC device of the instant invention is able to work together with any device or system having at least one general purpose input/output contact of said two capabilities, that is, having a push/pull output capability, and an analog signal input capability.

It shall be noted that in this exemplary application, the bridge excitation voltage and the supply voltage of both the inventive IC device (1) and the microcontroller (21) are taken off the same rails (16, 17), hence, if the ADC uses the supply voltage as the reference voltage for the conversion process, which is common for such microcontrollers, a ratiometric measurement system may be implemented that needs no accurate voltage source whatsoever. Interference on the power supply rails emanating from the microcontroller itself is of no concern as long as the microcontroller can do the conversion process during a 'sleep' mode, in which all of its internal processing except for the ADC is stopped. This 'sleep' feature nowadays is common in the field of microcontrollers. Interference coming from third parties over the supply lines can be filtered out by simple passive RC filters in the supply lines.

It shall be emphasized that the presented application according to FIG. 2 may be the cheapest possible way to manufacture high-accuracy intelligent sensors. Contemporary microcontrollers often have internal EEPROM which can be used to store calibration tables, or they have flash memory which is in-circuit programmable, so the calibration data could be stored in program memory and updated whenever needed. Since the inventive IC device (1) according to the objectives of the invention is very cheap to manufacture, and the standard low-contact-count microcontroller can reap cost benefits of mass production despite of featuring a high performance ADC, it is very questionable whether a special purpose sensor ASICs with embedded microcontroller of the state of the art could beat the price of an intelligent sensor system built according to this example.

Referring to FIG. 2 again, now a basic method to operate the inventive IC device (1) and its bidirectional mixed signal single-wire interface is disclosed, in which the mixed signal single-wire line has at least two operational states, one for the reception of commands, and one for transfer of the conditioned analog signals, in which the signalling of the end of transmission to the integrated circuit is possible any time, even if it is still in the analog transfer mode. The two operational states may be two particular states of a state machine within the digital control means.

Command Reception Mode

In the command reception mode, the mixed signal single-wire interface is in a digital mode of operation and is used to transfer digital command bits from the host (21) to the inventive IC device (1). Command bits are issued by activation or deactivation of the PMOS (27) or the NMOS (28) driver devices of the host's digital output driver. Command bits are discerned by the command detection means (3) and collected and interpreted by the digital control means (4) of the inventive IC device. At least one command exists to switch to analog signal conditioning mode.

Analog Signal Conditioning Mode

In the analog signal conditioning mode, the mixed signal single-wire interface is in an analog mode of operation and is used to transfer conditioned analog signals from the inventive IC device (1) to the host (21). The host further processes said analog signals. Upon the event of a termination criterion becoming logic 'true', the analog signal conditioning mode ends, and another mode is being entered, which may be the command reception mode again, or a third mode which allows the host to detect proper termination of the analog signal conditioning mode.

In example, the termination criterion trivially may be the run out of a timer located within the inventive IC. However, this had the drawback that the duration of the analog signal conditioning mode must be fixed when the command is given.

Analog Signal Conditioning Mode—Novel Method with Counter-Drive by the Host as a Termination Command for an Analog Signal Transfer on a Mixed Signal Bus In the preferred embodiment, the termination criterion to end the analog signal conditioning mode is an overcurrent condition within the inventive IC's analog output driver stage (11) which drives the mixed signal single-wire line (19), wherein the overcurrent condition is caused by the host (21) activating at least one of its PMOS (27) or the NMOS (28) driver elements. This way succeeds in leaving the duration of the analog signal conditioning mode unspecified and a decision on its termination may be made during the signal processing.

The current detection means used to detect the overcurrent condition used to terminate the analog signal conditioning mode can be used in an inventive way to serve for a particularly noise immune and versatile novel method of command transmission in the command reception mode.

Command Reception Mode—Overcurrent Conditions as a Novel Method for a Self-Clocking Command Transmission on a Mixed Signal Bus The described current detectors as command detection means permit the use of a novel method for command transmission on a mixed signal bus, which has the property that on the bus, due to its mixed signal nature, there can be found any possible voltage level, especially when conditioned analog signals are being transferred over the bus. This property renders the command transfer using conventional digital logic levels infeasible. The novel method for command transmission is based on the fact that a host having a strong digital output driver connected to the bus can generate an overcurrent condition needed to activate the current detectors independently from the voltage level which is on the bus. In the preferred embodiment of the invention, upon detection of such an overcurrent condition by the current detection means, the digital control means switch the inventive IC into a command reception mode in which the analog output drivers (11) connected to the second contact (6) try to weakly drive the bus to a predetermined voltage level. This voltage level can be in the mid of the two supply voltage levels. As the host now activates his digital output driver (28) for 'logic 0', a current above the threshold of the command detection means is being pulled out of the second contact (6), and the signal for command bit '0' (9) gets active. In a similar way the signal for command bit '1' (8) gets active when the host activates its digital output driver (27) for 'logic 1', causing a current into the second contact (6). The command bit signals (8, 9) stay active as long as digital output drivers (27, 28) at the bus are activated, and get inactive when the host switches off its digital output drivers. This event can be used as a clock signal for clocking the previously discerned command bit into the digital control means. Hence, this novel method for command transmission on a mixed signal bus is self clocking and does not need a stable time base, nor a costly clock recovery, nor complex timing schemes.

Novel Use of Current Limiting Circuits of Analog Signal Driver Stages Driving a Mixed Signal Bus as a Part of Command Detection Means In the art of analog circuit design various means for short circuit protection and thermal protection of analog output drivers are known. For this, as a rule, the current in the output driver stage is observed directly, in example by the voltage drop over series resistors, or indirectly by replica stages, which imitate the events in the output driver stage in a scaled form. If the current exceeds a threshold, a protection transistor opens and begins to weaken the control signal of the driver transistor in order to prevent a further increase of current in the output driver stage. In bipolar technologies it is furthermore common to decrease the current threshold value with increasing chip temperature. Independent from whether a CMOS or bipolar technology is used, and independent from the implementation of the current limiting circuits, these are often implemented anyway to provide a robust and state of the art short circuit proof product. In this case the known and available current limiting circuits can be exploited in an inventive way as part of the command detection means in accordance with the claims of the invention, by amplifying the opening signal of the protection transistor and then bring it as a digital command bit signal (8, 9) to the digital control means. In this case the additional expenditure for the realisation of the command detection means is very small.

Acknowledge Mode—Novel Use of Current Limited Output Driver Stages for the Current Saving Generation of an Acknowledge Pulse Upon Release of a Mixed Signal Bus If relatively calm analog signals are to be processed, then it is desirable to have an unambiguous acknowledge signal which allows the host und unambiguously detect the correct termination of the analog signal conditioning mode. This is not trivial to solve, because a conditioned analog signal can be thought of which is relatively calm and accidentally causes the same voltage levels at the mixed signal interface as the commend reception mode does. In this general case, which often happens with sensors, an acknowledge signal is advantageous which unambiguously differs from any thinkable analog signal.

Therefore, a third mode of the mixed signal single-wire interface is implemented, which is entered after the end of the analog signal conditioning mode caused—as explained above—by the activation of the host's digital output driver. It is assumed this digital output driver is still switched on. Now, in the acknowledge mode, a driver stage (11) of the inventive IC is steered in such a way that it attempts to weakly invert whatever logic state is being driven onto the second contact (6) by the host.

Obviously, it won't succeed in doing so, since its current limiting makes it much feebler as the strong digital output driver of the host. Due to the current limiting being active, one of the two command bit signals (8, 9) also is active, and the current consumption stays within reasonable limits. As soon as the host deactivates its digital output driver stage after a brief time delay which gives the inventive IC sufficient time to react, the mixed signal bus is released and finally the driver stage (11) succeeds to set the bus to the inverse logic state, hence on the bus there results a quick signal change from the lowest possible voltage to the highest possible voltage, or vice versa, depending on the state the termination signal had. This fast signal change can be detected by the host with his analog signal processing means, its ADC (26) or a comparator or the like, or, if applicable, by configuring its general purpose input/output contact (20) as a digital input.

Otherwise, if the termination of the analog signal conditioning mode had failed for any reason, such as a termination counter-drive that was too weak or too short, the inventive IC device still would be in analog signal conditioning mode and still would output analog signals, which can be easily discerned from static logic signals near the power supply voltage levels as long as the host can use its analog signal processing means for the purpose. If the host finds that the characteristic fast signal change is missing, and the analog signal conditioning mode still is present, then he can do another attempt for its termination.

In case of an host using a digital input, such as a schmitt trigger, for the test, and depending on the state of the analog signal in that moment, a false conclusion is likely. This can be avoided if the acknowledge mode provides for more than one logic level reversal in a sort of dialog between the IC device and the host. In example, if the first overdrive was towards the ground rail, the inventive IC device tries to weakly drive the bus towards the positive power supply rail. Now, when the host releases the mixed-signal bus line and indeed observes a 'logic 1' there, it actively drives the bus line back to ground again and then to the opposite power supply rail. The inventive IC device can detect this as another counter-drive current pulse and, when in acknowledge mode, upon detection of another current pulse, inverts the direction of its weak drive. So if the host then releases the bus again, it now will be pulled towards ground by the inventive IC device. It is not very likely to find this fast dual inversion in real bandwidth limited analog signals so the assertion of proper termination of the analog signal conditioning mode using digital input means of the host is much more reliable as in the single inversion case. This acknowledge method can also be extended to more than two fast inversions, which are controlled by a series of counter-drive current impulses from the host.

More elaborate schemes to signal proper termination of the analog signal conditioning mode are possible if the inventive IC device outputs as an acknowledge signal a special predetermined digital pulse sequence or a burst of very rapidly changing oscillations that cannot occur in any conditioned analog signal.

However, the preferred solution is to use the method with one fast signal change and the host's analog signal processing means for the purpose of detection of the acknowledge signal. In this case the agreement is recommended that the host will activate its driver once again after detection of the acknowledge signal and then releases the bus again, such that the inventive IC detects the additional counter-drive current pulse and uses it as a control signal for the transition from the acknowledge mode to the command reception mode.

Digital Read Mode—Novel Use of Counter-Drive by a Host as a Command to Switch to the Next Bit to Be Read The utility of the invention may be increased if the host is further able to read purely digital data from the inventive integrated circuit. This is achieved by introduction of a digital read mode, in which the means and methods of the previous variants are modified and enhanced in an inventive way to implement the digital read mode with the least expenditure and consistent with the teachings of the invention.

In the digital data read mode the mixed signal single-wire interface is in a digital mode of operation and is used to transfer digital data bits from the inventive IC device (1) to the host (21). The inventive IC device may employ an additional purely digital output driver stage connected to its second contact (6) to drive digital logic levels onto the mixed signal single-wire line, and any of the known methods to transfer digital data over one line, such as in RS232C communications, or pulse-width modulation, etc., may be used.

In the preferred embodiment of the invention, digital read mode is implemented with minimum expenditure by advantageously reusing the means according to the invention in a novel way, in particular, the output driver stage (11) of the analog signal conditioning means (2) and the command detection means (3), which in case of the preferred embodiment are able to detect overcurrent caused by activation of the host's digital output driver stage (27, 28). The inventive IC device drives the digital logic level of a data bit onto the mixed signal single-wire line by using the output driver stage (11) of the analog signal conditioning means. Upon reception of the data bit by the host—which can either use its analog signal processing means for the purpose, or, if provided by the general purpose contact (20), a purely digital receiver such as a schmitt trigger—the host uses its digital output driver stage (27, 28) to drive the mixed signal single-wire line to the opposite logic state. This counter-drive causes an overcurrent detection pulse within the inventive IC device's command detection means, which in this case is interpreted by the digital control means (4) as a handshake or clock pulse to advance to the next bit to be transmitted to the host. Activation of the host's digital output driver stage (27, 28) can be very brief, and as soon as the counter-drive is being detected, the output current of the driver stage (11) of the inventive IC can be reduced, so this scheme does not need to consume much power. As the following release of the bus by the host also can be easily detected, driving the next bit with more power (and speed) after the event of release would be possible by adaptively controlling the current limiting of the driver stage (11). When all data bits are transmitted, digital read mode ends and another mode of operation, such as command reception mode, may be entered.

Novel Methods and Means to Operate Multiple Members on a Mixed Signal Bus, in which Non-Selected Members Passively Monitor Sequences of Three Different Voltage States on the Mixed Signal Bus to Detect the End of the Data or Analog Signal Transfer Between the Selected Member and the Host Yet another method to operate the inventive IC device (1) and its bidirectional mixed signal single-wire interface allows to connect more than one of the inventive IC devices to the same mixed signal single-wire line, creating a novel mixed signal bus system. This is achieved by providing at least one idle mode in the set of operational modes known to the inventive IC device. Such an idle mode trivially may be implemented by having a chip select contact at the inventive IC device which is controlled directly by the host, or by a decoder which is in turn being driven by the host, or some other chip select scheme known in the art. Only the sole inventive IC which is selected will respond to commands and uses the bus. However, this trivial solution would weaken the advantage of the invention of tying up just one host contact. One solution to this dilemma is to provide an addressing scheme in which each of the inventive IC devices connected to a common bus has a unique address, which is transferred as part of the command word. Assuming that some means and methods exist so as to provide this address within each inventive IC device, a novel method to operate multiple inventive IC devices on a mixed signal single-wire bus can be formulated as follows:

In the command reception mode, the host sends address bits as part of the command word which select one particular IC device among those connected to the mixed signal single-wire bus. The selected IC device responds in the usual manner, but all other, non-selected IC devices, enter an idle mode of operation after having received the command. The particular kind of idle operational mode may depend on the type of command being executed by the selected IC, so as to choose from different command termination criteria. The non-selected inventive IC devices passively monitor the bidirectional mixed signal single-wire bus until the suitable command termination criteria appears, and then leave the idle operational mode to be prepared to receive another command. The host may then issue a command whose address bits do select the same inventive IC device again, or it may select another inventive IC device connected to the same mixed signal single-wire bus.

By this method, more than one of the inventive IC devices can be connected to the same mixed signal single-wire bus without need of any further contact on neither the inventive IC devices nor the host. One of the distinctive characteristics of the present invention's method to operate several of the inventive IC devices on the same single-wire bus is the novel ability of the inventive devices and methods to operate them to cope with true mixed signals on the bus, that is, at some time intervals, digital signals are present on the bus, and on other time intervals, analog signals are present on the bus, so it is non-obvious how the deselected inventive IC devices could reliably detect termination of the previous command and begin of a new command issued by the host despite of not being allowed to exert any influence on the bus, as any such activity not coming from the selected IC device would alter the analog signals and interfere with the desire of high accuracy and signal integrity. This matter is further complicated by the fact that the time duration of a particular command being executed is unknown and no accurate time base is present.

Figure 3:
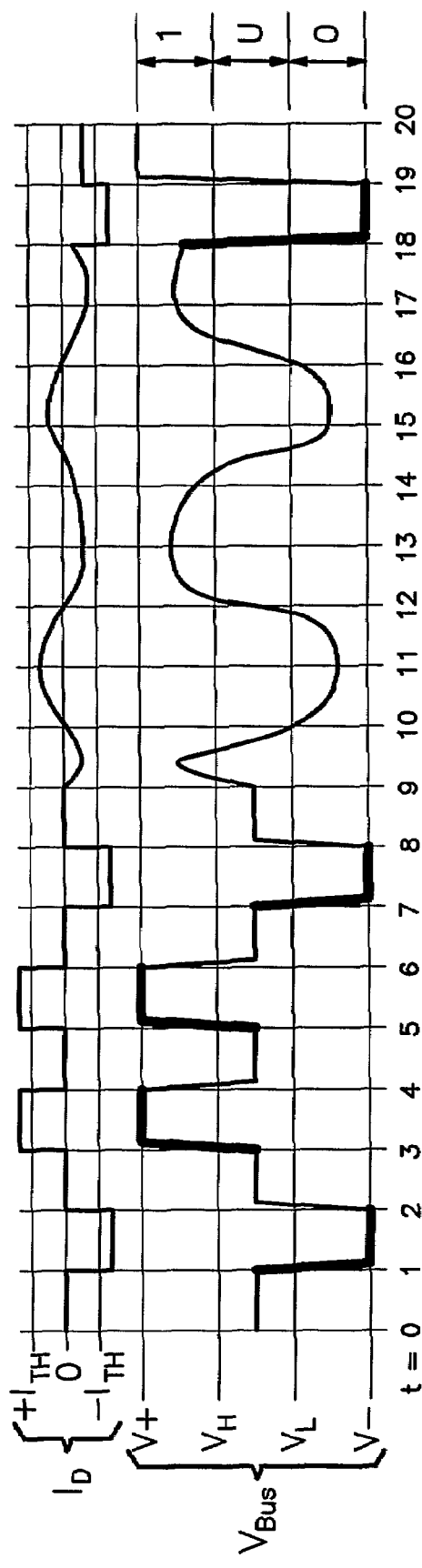
FIG. 3 shows examples of voltages and currents over time as observable on the mixed signal single-wire bus.
Figure 3:
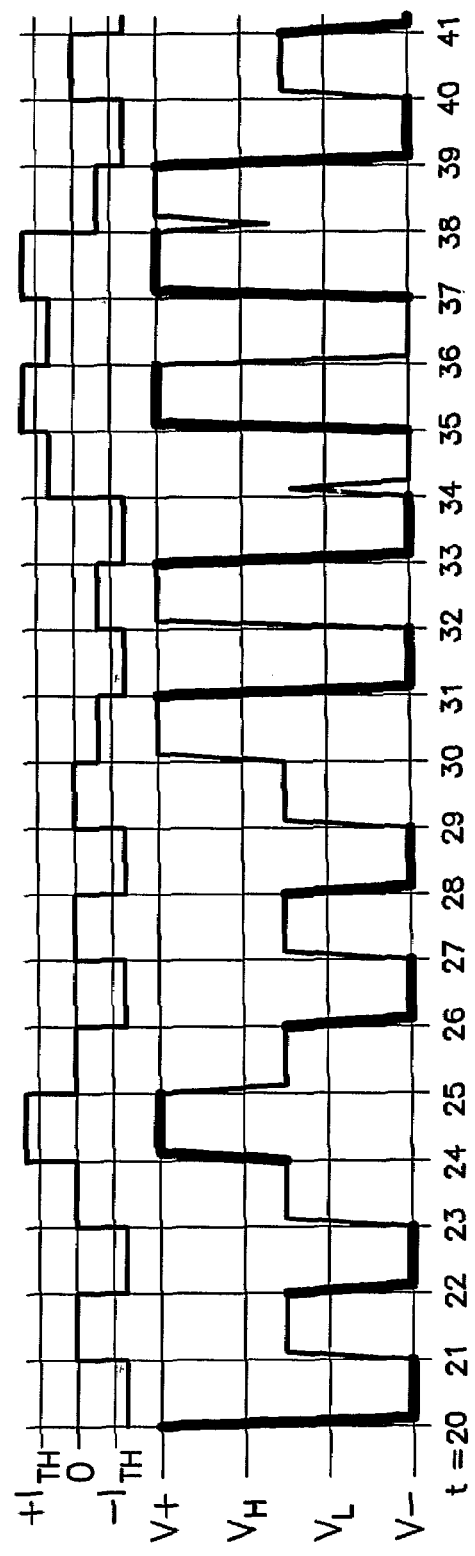

Now, referring to FIG. 3, which shows a diagram of typical voltage and current levels on the mixed signal bus having at least one of the inventive IC devices connected to it, it will be disclosed how another one of the inventive IC devices connected to the same mixed signal bus can detect the end of command execution of the active IC device.

In the FIG. 3 the voltage on the bus is designated with '$V_{BUS}$'. The minimum and maximum voltage levels on the bus, which depend on the supply voltage, are designated '$V_+$' and '$V_-$'. '$V_H$' and '$V_L$' designate threshold voltage values for detection of logic states. It is assumed that the inventive IC device in this advanced embodiment has means to compare the voltage level on the bus to these threshold voltage values. As described above, useful means for this are comparators which are connected to the second contact (6). The threshold voltage levels '$V_H$' and '$V_L$' can be derived from the supply voltage by a voltage divider and then be fed to the comparators. Preferably, they correspond each to a third of the supply voltage range. Since these means serve to detect the termination of a running command and the beginning of a new command, they are also command detection means in the spirit of the invention. In the now treated advanced embodiment of the invention the command detection means as a whole hence have the ability not only to detect overcurrent conditions in the analog signal output driver stage, but also to divide the voltage level on the mixed signal bus into three intervals, 'logic 0' (below the threshold $V_L$), 'logic 1' (above the threshold $V_H$) and 'logic U' (between the thresholds $V_H$ and $V_L$). It shall be noted that the voltage curve shown in the figure is idealized to achieve a better clarity of presentation, in particular, in reality the signal edges won't be straight lines, and because of the saturation voltages of the driver transistors the supply voltages won't be reached fully. However, despite of the idealisation, the shown voltage curve on the mixed signal bus is typical for the invention—especially the command transmission—and the appearance of similar curves in an oscillogram always is a circumstantial evidence for the use of the invention.

The current through the output driver stage (11) is designated with '$I_D$'. The convention holds that a current flowing into the second contact (6) from the outside has a positive sign. The positive threshold value $+I_{TH}$ and the negative threshold value $-I_{TH}$ for command detection each are symmetrical to the zero line. In the figure, it is assumed that the current limiting action of the analog signal output driver stage (11) sets in so mildly as to allow non-ambiguous and noise immune exceeding of the threshold values. For better clarity of the presentation the current curve in the figure likewise has been idealized and further it was assumed that there is a symmetric resistive load on the mixed signal bus, this can be thought of as two resistors of the same value tied from the bus to one of the power supply rails each. In reality, this load condition can occur in particular with resistive feedback networks of the analog signal conditioning means, which refer to a virtual ground in the mid of the power supply voltage.

As most of the analog-to-digital converters of microcontrollers represent a relatively large capacitive load, capacitive load current components would be added, these were disregarded in the figure, since they would only lead to confusion. For the understanding of the following explanation it is just decisive whether the current exceeds the threshold values $-I_{TH}$ and $+I_{TH}$ or not. By appropriate design of the signal processing bandwidth and the threshold values it is always possible to make sure the threshold values will only be exceeded if the host activates his output drivers.

In the beginning, at t=0, both inventive IC devices are assumed to be in the command reception mode, which may be a power up state of their internal digital control means or may have been entered by some other method of operation according to the invention. In command reception mode, all inventive IC devices on the bus are active and try to weakly drive the bus to a predetermined voltage level between the power supply rails, which is distinct from either the logic '0' and logic '1' voltage levels. Preferably, for optimum noise immunity, the predetermined voltage level is in the middle of the supply voltage. The weak driving may be implemented in such as way that currents in an analog signal output driver stage (11) tied to the bus have a small magnitude when the voltage level on the bus is near mid of the supply voltage, and gradually increases as the voltage on the bus is being externally driven by the host towards the power supply rails. Such a resistive output characteristic avoids fighting between the output stages of the inventive IC devices. It is long known in the art of analog circuit design on how to implement any output characteristic, so no detailed schematics are given. The idealized presentation of the currents in the figure obviously does not take this resistive output characteristic into account, otherwise the edges of the current would have been drawn tilted.

Now, at t=1, the host pulls the bus towards V−. In the figure the parts of the voltage curve in which the host activates his output drivers are drawn with a thicker line. In the output driver stages of the inventive IC the current increases until the negative threshold value $-I_{TH}$ is reached, the current is limited, and the command bit '0' is detected.

In the idealized presentation of the currents this happens instantly, but in reality the steering of the driver stage would have a ramp of finite slope, and hence, also the current. The differences between the idealized presentation in the figure and in practice now should be known and won't be mentioned in the following text anymore.

At t=2, the host releases the bus. The '0' command bit is being clocked into the digital controls means. All inventive IC devices together pull the bus back to mid-rail. At t=3, the host drives the bus towards $V_+$. Current increases in the output stages of all inventive IC devices until the positive threshold $+I_{TH}$ is reached, the current is limited, and a logic '1' command bit is detected. At t=4, the host releases the bus. The '1' command bit is being clocked into the digital controls means. All inventive IC devices together pull the bus back to mid-rail. This process continues until all command bits are clocked into all of the inventive IC devices, which in this example, is the case at t=8, after four command bits. Part of the command bits are addresses, so the selected IC executes the command while the non-selected ICs go into the idle mode of operation. Assuming that the command was start of analog signal conditioning mode, then the selected IC begins at t=9 to drive analog signals on the bus, while the non-selected ICs enter analog signal idle mode.

Analog Signal Idle Mode

During analog signal idle mode, the non-selected ICs passively monitor the voltage levels on the bus and divide it, as already explained, in three intervals, 'logic 0', 'logic 1' and 'logic U'. Although in the analog signal conditioning mode it is a pure analog signal, and not a digital signal, this classification into the three intervals is always possible, even if the analog signal is arbitrary and hence, also a rule, does not represent any meaningful digital code.

However, by analysing these pseudo-digital sequences, the non-selected ICs amazingly succeed to discern the termination of the analog signal conditioning mode.

This termination is effected by the host at t=18, by pulling the bus towards V−. In the selected IC currently in analog signal conditioning mode, the resulting current pulse is detected by the command detection means and acknowledge mode is entered, such that the selected IC device ceases to drive a conditioned analog signal on the bus, but instead tries to weakly drive the inverted logic state, which is a '1'. At t=19, the host releases the bus to test the acknowledge signal. He detects a successful termination by a fast logic '0' to '1' signal transition on the bus. As soon as the host detects that signal transition, and the final clean logic '1' state is reached, the host pulls down the bus again at t=20, and releases it again at t=21 to bring the active inventive IC device out of acknowledge mode and into command reception mode. In alternate embodiments, in which the acknowledge mode demands more than one fast signal transition on the bus, accordingly several fast signal transitions would be visible on the bus.

While this mixed signal bus protocol takes place between the host and the active inventive IC device, the non-selected, passively monitoring inventive IC devices should discern from this that the analog signal conditioning mode is terminated, the acknowledge mode has gone by, and the command reception mode is initiated.

Key to the nonobvious method is the fact that analog signals usually are bandwidth limited, and the analog signal conditioning means, commonly being analog circuits such as operational amplifiers and the like, are both bandwidth and slew rate limited. Hence, during analog signal conditioning mode, the voltage level on the mixed signal bus cannot jump from below the threshold $V_L$ for 'logic 0' to above the threshold $V_H$ for 'logic 1' in arbitrarily short time and vice versa. During analog signal conditioning mode, even if the analog signal being driven on the bus has a large enough swing to exceed these thresholds towards the power supply rails, it will always travel through or dip into the 'logic U' zone between these thresholds, and it will stay there for a certain time duration that depends on the nature of the analog signal currently being processed and on the parameters of the bandwidth and slew rate limitations of the analog circuitry involved. In contrast to this the bus can go through a full logic swing in just a few nanoseconds when the powerful digital output driver stage of the host is being activated, and the period of time in which the bus is in the 'U' zone is very short. In the disclosed methods of operation of the mixed signal bus such a quick transition from either 'logic 0' to 'logic 1' or 'logic 1' to 'logic 0' never occurs during analog signal conditioning mode, but always during acknowledge mode, in the figure at t=20. This fact can be advantageously exploited by the passive ICs to detect the end of analog signal conditioning mode of the active device as follows.

The passive IC devices being in analog signal idle mode employ the logic level threshold comparators being part of their command detection means to constantly monitor the voltage level on the mixed signal bus. As long as there are 'logic 0' or 'logic 1' with 'logic U' in between, they stay in analog signal idle mode. As soon as a transition from 'logic 0' to 'logic 1' or from 'logic 1' to 'logic 0' with no or a very short 'logic U' in between occurs, and as soon as a longer 'U' follows that, in the figure at t=21 to t=22, the analog signal idle mode is terminated and command reception mode is entered. The time duration criterion for the 'very short' or 'longer' duration of the 'logic U' states needed herefore can be implemented by very crude delay elements, like RC-delays, or their MOSFET-equivalents, and no accurate time base is needed, since in this system the difference between 'very short' and 'longer' is about an order of magnitude or even more, furthermore, the delay can be designed to track the same process parameters that dictate the bandwidth and slew rate properties of the analog circuits within the IC device. Any practitioner of the art of analog circuit design can easily provide a circuit level solution that implements this method and its means according to the spirit of the invention.

Now, referring to FIG. 3, it will be disclosed how an inventive IC device passively monitoring the bus can detect the end of command execution in case of the digital read mode.

Assuming that the host issues a digital read command from t=22 to t=29, in the example the command bit pattern would be '0100', part of which again is an address to select one of the inventive ICs connected to the mixed signal bus, the selected IC enters digital data read mode at t=30 and begins to drive the first data bit, in this case a 'logic 1' on the bus. In the preferred embodiment, the active IC uses the analog output driver stage of its analog signal conditioning means for this purpose, as it has current limiting and current detection circuitry. For speed, the inventive IC device may have an additional digital output driver stage connected to its second contact, which is activated for a short time interval to yield fast rise and fall times, and then is switched off, whereupon only the weaker analog output driver stage then is holding the bus at the logic level corresponding to the data bit just being read. At t=30.5, the host samples the data bit and at t=31, the host drives the bus to the opposite logic state. Due to the current limiting, the bus indeed swings towards the negative power supply rail, while the command detection means within the IC device detect that the current in its output buffer stage exceeds the threshold $-I_{TH}$, like in command mode, but during digital read mode this event is being interpreted by the digital control means as a command to proceed to the next data bit, which takes effect as soon as the host releases the bus again at t=32 and the current falls below the threshold. The IC drives the next data bit on the bus at t=32, the host samples it at t=32.5, inverts the logic state on the bus by activating its output driver stage at t=33, releases the bus again at t=34, where now a 'logic 0' is likewise being driven by the IC device, so the voltage on the bus does not move much, any possibly observable voltage excursion near t=34 would be caused by the delay the IC device's internal logic needs to react to the host's bus release. Further data bits follow, at t=38.5, the host samples the last one, inverts it at t=39, and finally releases the bus at t=40. The active inventive IC device knows after detecting the final current pulse from t=39 to t=40 that this was the last bit, and hence terminates the data read mode, enters the command reception mode, in which it tries to weakly drive the bus to the mid of the power supply rails, which can be seen from t=40 to t=41. At t=41, the host already drives the first command bit of the next command word onto the bus.

Based on the foregoing, now can be disclosed a method which enables a non-selected IC to detect the end of the digital data read mode, and the beginning of the following command reception mode.

Data Read Idle Mode

When the data read command is completely received, the non-selected ICs whose address does not match, enter a data read idle mode. In this mode, they passively monitor the voltage levels on the mixed signal bus, just as has been described above for the analog signal idle mode, and the same comparator means can be used to assign the voltage level to the three logic states, however, in case of data read idle mode, the termination criterion is different. In data read mode, just at the end of the command mode, there may be a brief period of 'logic U' of unspecified length, depending on how long the active inventive IC device needs to output the first data bit on the bus, in the figure from t=29 to t=30. From this first data bit on, by using proper driving characteristics, the bus, now being used in a purely digital mode of operation, will only show fast transitions through the 'logic U' zone. An optional additional digital output stage driver within the inventive IC device may be useful in cases where its analog output driver stages could not be operated quickly enough, which may or may not be the case depending on the semiconductor technology used to implement the IC device. In any case, however, the deselected IC devices being in data read idle mode after the initial 'logic U' will only detect fast 'logic 0' to 'logic 1' or 'logic 1' to 'logic 0' transitions on the bus, since the 'logic U' in between are too short to be detected or are filtered out by delay elements. The same logic and reasoning applies here as previously disclosed for analog signal idle mode. In case of data read idle mode, however, the termination criterion is just the opposite: data read idle mode is left whenever, after the optional initial 'logic U' followed by a series of an arbitrary number of fast transitions from either 'logic 0' to 'logic 1' or 'logic 1' to 'logic 0', finally another 'logic U' of longer duration is discovered. This 'logic U', in the figure at t=40 to t=41 belongs to the first phase of the following command, leaving just enough time for the digital control means of the passive ICs to bring them out of data read idle mode and into command reception mode.

It is understood that an IC device according to the invention does not necessarily need to implement all of the above means and methods to operate more than one of the inventive IC devices on the same bidirectional mixed signal single-wire bus. If only a subset of the vast range of powerful functionality and possibilities offered by the invention in its full-blown embodiments is desired, then some of the means and methods disclosed herein do not need to be implemented and used, without thereby evading the spirit of the invention and its claims.

Providing Addresses

For providing addresses within the individual inventive ICs, several assumptions must be made on how many of such ICs having the same functionality one would reasonably want to hook to the same mixed signal single-wire bus. A survey of typical applications has shown that having more than four sensors on a single line would happen quite seldom, hence, two bits of addresses would suffice.

These two bits can easily be provided by metal mask options and stocking four slight variations of each IC device type is not of much burden. Address mask bits within the command word can be used to allow the use of more than one variant in those applications that need only two or one of such ICs on the same bus. Alternatively, a single contact on each IC which is either left floating or is being tied to one of the power supply rails could be used to set the IC's address to one of three possible addresses. The addressing scheme could also be enhanced by fixed bits that are unique for each different kind of IC, for instance, IC devices specialized for temperature transducers may be assigned a different domain of the address range than those specialized for bridge type sensors. The type number of the IC also could be used as part of the address.

Novel Method to Operate Conventional Integrated Circuits Together with the Inventive ICs on a Mixed Signal Bus, without the Conventional Integrated Circuits Having a Mixed Signal Interface Nor Knowing the Bus Protocol of the Mixed Signal Bus Finally, a last method to operate the inventive ICs and their bidirectional mixed signal single-wire interface will be disclosed which is intended to allow conventional ICs of the digital logic or memory variety to use the bidirectional mixed signal single-wire bus in a digital compatibility mode of operation, thereby enabling the connection of one or more of the inventive ICs together with conventional ICs to the same mixed signal bus to allow full exploitation of the possibly scarce resource of port contacts on the host device. It is understood that conventional ICs cannot know or implement the inventive mixed signal bus protocol and the novel methods to operate the inventive ICs and its bidirectional mixed signal single-wire interface as disclosed above, so the possibilities of said compatibility mode are limited, and in particular those contacts of the conventional ICs which are connected to the mixed signal bus must be under control of some host output or other sources of a chip select signal to disable their possible output driver into a high impedance state when the inventive ICs are using the mixed signal bus.

Compatibility Mode

The inventive method of compatible operation is based on the fact that conventional digital ICs always use full logic swings, in particular with them a release of the bus, which can happen briefly during changes in the direction of the data flow, never is used as an actual control signal, as the present invention does, but is only provided to avoid fighting drivers and current spikes on the power supply voltages.

Since the conventional ICs as a rule do not have any means to detect a release of the bus, and during this never receive data, as it would be undefined, in any case it is harmless if the inventive ICs, during phases where the bus is not being driven by the host or by any conventional IC, similar to the command reception mode, try to weakly drive the bus towards a predetermined voltage level, which in the preferred embodiment is in the middle of the supply voltage.

Hereby a data transfer between the host and the conventional ICs is not impaired or disturbed in any case, but the inventive ICs can use their command detection means to observe what happens on the mixed signal bus. In this way, under certain prerequisites, they can find out when the data transfer between the host and the conventional ICs is completed.

Key to the novel method of compatible operation is a special command within the inventive IC devices, which, upon its execution, places the digital control means into a compatibility mode in which the inventive ICs weakly try to drive the bus to a predetermined voltage level, similar to what they do in command mode, but the overcurrent conditions being caused by communication between the conventional IC device and the host now are not interpreted as command bits, but, when they cease, serve to detect a 'bus float' event, where both the host and the conventional ICs have released the bus, that is, do not drive it actively anymore. Depending on the implementation of the invention this alone can be used as a termination criterion for the compatibility mode, or these events are counted in a counter being part of the digital controls means of the inventive ICs, in which the termination criterion of the compatibility mode is the reaching of a counter state being either fixed or programmed by the command word. In both cases, when the termination criterion of the compatibility mode appears, that mode is left and the command reception mode is entered.

The preferred compatible method of operation comprises, prior to data transfer with conventional ICs, a command word given by the host to all inventive IC devices connected to the bus which brings them into compatibility mode, also transferring with it how often the mixed signal bus will be released by all drivers taking part during the completion of the data transfer according to a conventional bus protocol—such as SPI. In most of the conventional bus protocols that number is known before transactions on the bus take place. After that command word was given, the host carries out the conventional bus protocol for the conventional ICs in the known way, while the inventive ICs count how often the bus is being released, and after the last event of that kind, after the termination of the conventional data transfer, switch into command reception mode again.

A simplified compatible method of operation needs no counter, but the host masks the changes of direction by kee-contactg its own output drivers steadily on, and switching them off only when the conventional ICs, according to the conventional bus protocol, in any case already drive a valid data bit onto the bus, and he again activates his own output drivers before the conventional ICs cease to drive the data bit. To avoid harmful current spikes due to fighting output drivers, in this simplified compatible method of operation the conventional ICs are connected to the mixed signal bus via a series resistor, which limits the currents to safe values without weakening the digital signal too much.

Sleep Mode

The inventive ICs may have a command which brings their internal circuitry into a sleep mode, in which their current consumption is minimal. The wakeup can take place by a signal change at the second contact (6), whereupon the command reception mode is being entered.

As is clearly seen that the present invention and its various embodiments and variations constitutes a significant advance of the state of the art in the field of analog integrated circuit design and in the architecture of single-wire bus systems for such integrated circuits. At the time of the patent application, no IC from any manufacturer is known to possess the unique combination of distinctive characteristics, means and methods outlined in this document, and the inventor believes that several industry firsts are achieved:

the first device employing a bidirectional mixed signal single-wire interface for both receiving digital commands from a host, and providing conditioned analog signals to the host, while needing only a few easily implemented circuit means therefore, and needing no special circuit means whatsoever at the host except for a conventional general purpose I/O contact as known from suitable host devices such as microcontrollers.

the first implementation of a bidirectional mixed signal single-wire architecture that can be used together with several of the inventive IC devices tied to the same mixed signal single-wire bus, which makes it possible to use the same bus to transfer digital data between the host and conventional IC devices, hence, featuring full compatibility between the novel mixed signal single-wire architecture and many of the single-wire or two-wire bus architectures known to the prior art.

It is believed the present invention is especially effective when configured and employed as described herein, however, those skilled in the art will readily recognize that numerous variations and substitutions may be made in the invention and its use and configuration to achieve substantially the same results as achieved by the embodiments and, in particular, the preferred embodiment described herein. Each variation is intended to be included in this description and forms a part of the present invention. The foregoing detailed description is, thus, to be clearly understood as being given by way of illustration and example only, the spirit and scope of the present invention being limited solely by the appended claims.

LITERATURE

[1] U.S. Pat. No. 4,556,958, Ugon: "Device for single line bidirectional data transmission between an intelligent card's microprocessor and a second processor"
[2] U.S. Pat. No. 4,736,367, Wroblevski et al.: "Smart control and sensor devices single-wire bus multiplex system"
[3] U.S. Pat. No. 4,817,040, Bodley-Scott: "Vehicle condition monitoring system"
[4] U.S. Pat. No. 5,398,326, Lee: "Method for data communication"
[5] U.S. Pat. No. 5,412,644, Heberle: "Serial bus system with a single-wire line"
[6] U.S. Pat. No. 5,809,518, Lee: "Command/data transfer protocol for one-wire-bus architecture"
[7] U.S. Pat. No. 6,239,732, Cusey: "One-wire device with A-to-D converter"
[8] M. Degrauwe, J. Rijmenants, E. Vittoz, H. De Man, "Adaptive Biasing CMOS Amplifiers", IEEE Journal of Solid-State Circuits, Vol. 17, No. 3, June 1982
[9] U.S. Pat. No. 5,847,450, Fink et al: "Microcontroller having an n-bit data bus width with less than n I/O contacts"

TABLE OF DESIGNATIONS 1 integrated circuit (IC)
2 analog signal conditioning means
3 command detection means 4 digital control means
5 first contact
6 second contact
7 third contact
8 command signal line for command bit '1'
9 command signal line for command bit '0'
10 digital control line(s)
11 output driver stage
12 positive power supply feed line of 11
13 negative power supply feed line of 11
14 raw signal input
15 bridge sensor
16 second power supply rail (positive)
17 first power supply rail (negative), ground
18 power supply, battery
19 mixed signal bus line
20 general purpose input/output contact of 21
21 host/microcontroller
22 positive power supply contact of 21
23 negative power supply contact of 21
24 further input/output contacts of 21
25 microcontroller core
26 analog to digital converter/comparator
27 positive output driver element of 20
28 negative output driver element of 20
$V_+$ voltage level on 16
$V_-$ voltage level on 17
$V_H$ threshold voltage for 'logic 1'
$V_L$ threshold voltage for 'logic 0'

The invention claimed is:

1. An integrated circuit (IC) device comprising:
a semiconductor chip having circuitry to form analog signal conditioning means, command detection means, and digital control means;
a first contact,
a second contact,
a third contact,
wherein said first contact is electrically coupled to said circuitry and supplies a negative polarity power supply voltage or signal ground to said circuitry;
wherein said second contact is electrically coupled to said analog signal conditioning means and said command detection means such that it can act both as a command input and an analog signal output;
wherein said third contact is electrically coupled to said circuitry and supplies a positive polarity power supply voltage to said circuitry;
wherein said command detection means provide command information coming from said second contact to said digital control means;
wherein said digital control means are able to control said analog signal conditioning means such that said second contact can be switched between at least a command reception mode and an analog signal output mode;
wherein said analog signal output mode produces a voltage level on said second contact whose voltage magnitude corresponds to a conditioned analog signal prepared by said analog signal conditioning means.

2. An IC device according to claim 1, wherein in at least one of the said modes, command reception mode or analog signal conditioning mode, said command detection means do monitor the current flowing into and out of said second contact and compare the magnitude of said current to a threshold current value to derive command signals to said digital control means.

3. An IC device according to claim 2, wherein during said command reception mode said IC device drives said second contact to a command reception voltage level whose magnitude is chosen such that
if said second contact is externally shorted to said first contact a current will flow out of the second contact whose magnitude exceeds said threshold current value;
if said second contact is externally shorted to said third contact a current will flow into the second contact whose magnitude exceeds said threshold current value;
wherein command information consists of a group of separate command bits received serially;
wherein the logic value of a command bit, 0 or 1, is derived from the direction of current flow through said second contact while the magnitude of said current flow is above said threshold current value;
wherein the separation between said command bits is given when said current flow through said second contact falls below said threshold current value again.

4. An IC device according to claim 3, wherein said analog signal conditioning means have an analog output driver stage which is current limited by current limiting circuitry;
wherein during said command reception mode said current limited analog output driver stage drives said second contact to said command reception voltage level;
wherein said command detection means amplify signals within said current limiting circuitry to derive command signals from said second contact.

5. An IC device according to claim 3, wherein during said command reception mode said second contact is driven to said command reception voltage level by circuit means having a resistive output characteristic.

6. An IC device according to claim 2, wherein said analog signal conditioning means have an analog output driver stage which is current limited by current limiting circuitry;
wherein during said analog signal conditioning mode said current limited analog output driver stage drives said second contact to said conditioned analog signal;
wherein said command detection means amplify a signal within the current limiting circuitry to derive at least one command signal from said second contact;
wherein said command signal becomes active if the magnitude of the current flowing through said second pin exceeds said threshold current value;
wherein said command signal becoming active causes said digital control means to terminate said analog signal conditioning mode.

7. An IC device according to claim 6, wherein said digital control means after said termination of said analog signal conditioning mode enters an acknowledge mode in which said current limited analog output driver stage weakly drives the voltage level on said second contact to an opposite voltage level whose voltage magnitude is selected by said digital control means such that the current through said second pin falls below said threshold current value;
wherein said digital control means wait in said acknowledge mode until the current through said second pin exceeds and then falls below said threshold current value again and said digital control means then enter command reception mode.

8. An IC device according to claim 6, wherein said digital control means after said termination of said analog signal conditioning mode enters an acknowledge mode which has a loop with two steps;
a first step in which said current limited analog output driver stage weakly drives the voltage level on said second contact to an opposite voltage level whose voltage magnitude is selected by said digital control means such that the current through said second pin falls below said threshold current value;

a second step in which digital control means wait until the current through said second pin exceeds said threshold current value again;

wherein the loop continues at said first step if a predetermined number of first and second steps has not yet been reached, else the loop is left, and the command reception mode is entered as soon as the current though said second pin falls below said threshold current value again.

9. An IC device according to claim 2, wherein command detection means have voltage level comparators to map the voltage level on the second contact (6) to three logic states:
- a first logic state if said voltage level is below a lower threshold voltage value (VL);
- a second logic state if said voltage level is above a higher threshold voltage value (VH);
- a third logic state if said voltage level is between both said lower and higher threshold voltage values.

10. An IC device according to claim 9, wherein during command reception mode said second contact is driven to a command reception voltage level by circuit means having a resistive output characteristic;

wherein said command reception voltage level is chosen such that it lies between both said lower and higher threshold voltage values and hence corresponds to said third logic state;

wherein said first logic state is interpreted by the digital control means as a first command bit value;

wherein said second logic state is interpreted by the digital control means as a second command bit value;

wherein said third logic state is interpreted by the digital control means as the end of the command bit;

wherein said resistive output characteristic is chosen such that
- if the voltage level on said second pin is lower than said lower threshold voltage a current flows out of said second pin whose magnitude exceeds said threshold current value;
- if the voltage level on said second pin is higher than said higher threshold voltage a current flows into of said second pin whose magnitude exceeds said threshold current value;
- if the voltage level on said second pin is between said lower and higher threshold voltages a current flows through said second pin whose magnitude is below said threshold current value.

11. An IC device according to claim 9, wherein said digital control means are provided with at least one idle mode in which said IC device monitors sequences of said first, second and third logic states over time and upon detection of a sequence in time which indicates end of command execution leaves idle mode and enters command reception mode.

12. A method to operate several IC devices according to claim 11, the method comprising the following steps:
a) connecting said first contact of each IC device to a first power supply line;
b) connecting said third contact of each IC device to a second power supply line;
c) connecting said second contact of each IC device to a bus line;
d) connecting said bus line to a general purpose input/output contact of a host,
wherein said general purpose input/output contact has driver elements able to drive said bus line in the direction of the voltages at either one of said first and second power supply lines, such that the host, by means of said driver elements, can cause a current through said second contacts whose magnitude exceeds said threshold current value of said command detection means;
e) using driver elements of the host to send command information to said IC devices, by activating and then deactivating one of its driver elements depending on the logic value of each command bit, where said command information contains addressing information to select one of said IC devices and is structured such that said selected IC device executes the command and occupies the bus with signals and the nonselected IC devices enter an idle mode;
f) proceeding and finally terminating the command execution by activating said driver elements of the host in such a way that sequences of said first, second and third logic states over time occur on the bus line which terminate idle mode in the nonselected IC devices and bring all IC devices connected to said bus line into command reception mode again.

13. A method to operate an IC device according to claim 2, comprising the following steps:
a) connecting said first contact to a first power supply line;
b) connecting said third contact to a second power supply line;
c) connecting said second contact to a general purpose input/output contact of a host,
wherein said general purpose input/output contact has driver elements able to drive said second contact in the direction of the voltages at either one of said first and second power supply lines, such that the host, by means of said driver elements, can cause a current through said second contact whose magnitude exceeds said threshold current value of said command detection means;
d) using the host's driver elements to send command information to said IC device, by activating and then deactivating one of its driver elements depending on the logic value of each command bit, such that the IC device enters said analog signal conditioning mode;
e) configuring the host's general purpose input/output contact as the input of the host's analog-to-digital converter;
f) digitizing said conditioned analog signal on said general purpose input/output contact by employing the host's analog-to-digital converter;
g) configuring the host's general purpose input/output contact as an output;
h) activating the driver elements of the host's general purpose input/output contact in such a way that they drive against said conditioned analog signal and cause a current through said second contact whose magnitude exceeds said threshold current value of said command detection means, thereby terminating the analog signal conditioning mode.

14. An IC device according to claim 1, wherein said digital control means are provided with a digital read mode in which an output driver stage is driving digital data bits serially onto said second contact;
wherein the proceeding to the next digital data bit is controlled by said command detection means detecting a current flowing through said second contact whose magnitude exceeds said threshold current value.

15. An IC device according to claim 1, wherein said digital control means are provided with a compatibility mode in which said IC device drives said second contact to a command reception voltage level whose magnitude is chosen such that if said second contact is externally shorted to said first contact a current will flow out of the second contact whose magnitude exceeds said threshold current value;

if said second contact is externally shorted to said third contact a current will flow into the second contact whose magnitude exceeds said threshold current value;

wherein a bus float event is detected when the magnitude of the current flowing through said second contact falls below said threshold current value;

wherein the number of said bus float events is counted by the digital control means;

wherein the compatibility mode is terminated when said bus float event count reaches a predetermined value or a value given by the command information.

16. A method to operate first IC devices according to claim 15 comprising the following steps:
   a) connecting said first contact of each IC device to a first power supply line;
   b) connecting said third contact of each IC device to a second power supply line;
   c) connecting said second contact of each IC device to a bus line;
   d) connecting at least one contact of a conventional IC device to said bus line;
   e) connecting the bus line to a general purpose input/output contact of a host,
   f) connecting at least one control line of the conventional IC to a further output contact of a host or to decoding logic under control of a further output contact of the host, where said control line, if activated, allows the conventional IC to actively drive the bus line;
   g) prior to activation of said control line using the host to give a command to said first IC devices which brings them into a compatibility mode in which they can detect whether either the host or said conventional IC actively drives the bus, said command providing the number of bus float events which will occur during the following conventional bus transactions;
   h) employing the host to execute said conventional bus transactions with said conventional IC over the bus line, during which said bus float events are produced by the host both deactivating the driver elements of its general purpose input/output contact and deactivating said control line to the conventional IC;
   i) after expiration of said number of bus float events using the host's driver elements to give further commands to said first IC devices by activating and then deactivating one of said driver elements depending on the logic value of each command bit.

* * * * *